United States Patent
Lowe et al.

(10) Patent No.: US 9,343,043 B2
(45) Date of Patent: May 17, 2016

(54) METHODS AND APPARATUS FOR GENERATING COMPOSITE IMAGES

(71) Applicant: Google Inc., Mountain View, CA (US)

(72) Inventors: David Lowe, Vancouver (CA); Geoffrey Clark, Vancouver (CA); Matthew Brown, Bath (GB); Jeffrey Beis, Palo Alto, CA (US)

(73) Assignee: Google Inc., Mountain View, CA (US)

(*) Notice: Subject to any disclaimer, the term of this patent is extended or adjusted under 35 U.S.C. 154(b) by 47 days.

(21) Appl. No.: 13/957,298

(22) Filed: Aug. 1, 2013

(65) Prior Publication Data

US 2015/0035857 A1  Feb. 5, 2015

(51) Int. Cl.
| | |
|---|---|
| *G09G 5/00* | (2006.01) |
| *G09G 5/377* | (2006.01) |
| *G03B 37/02* | (2006.01) |
| *H04N 5/232* | (2006.01) |
| *H04N 5/262* | (2006.01) |
| G09G 5/14 | (2006.01) |
| G06T 15/50 | (2011.01) |
| G06T 11/60 | (2006.01) |
| G03B 13/02 | (2006.01) |

(52) U.S. Cl.
CPC ............... *G09G 5/377* (2013.01); *G03B 37/02* (2013.01); *H04N 5/23238* (2013.01); *H04N 5/23293* (2013.01); *H04N 5/2621* (2013.01); *G03B 13/02* (2013.01); *G03B 2217/18* (2013.01); *G06T 11/60* (2013.01); *G06T 15/503* (2013.01); *G09G 5/14* (2013.01); *G09G 2340/10* (2013.01); *G09G 2340/125* (2013.01)

(58) Field of Classification Search
CPC ............... G09G 5/14; G09G 2340/10; G09G 2340/125; G06T 11/60; G06T 15/503
USPC ............... 382/103, 118, 255, 274, 254, 284; 348/222.1, 79, 239, 77, 92, 253, 169, 348/584; 345/629, 419, 630
See application file for complete search history.

(56) References Cited

U.S. PATENT DOCUMENTS

| | | | |
|---|---|---|---|
| 6,704,041 B2 * | 3/2004 | Katayama | G06T 3/4038 348/36 |
| 6,711,293 B1 | 3/2004 | Lowe | |
| 6,771,304 B1 | 8/2004 | Mancuso et al. | |
| 6,798,924 B2 * | 9/2004 | Ejiri | G06T 7/0024 348/36 |
| 6,867,801 B1 * | 3/2005 | Akasawa | H04N 1/0035 345/633 |
| 6,885,392 B1 | 4/2005 | Mancuso et al. | |
| 7,064,783 B2 | 6/2006 | Colavin et al. | |
| 7,409,105 B2 | 8/2008 | Jin et al. | |
| 7,474,848 B2 * | 1/2009 | Gennetten et al. | 396/234 |
| 7,646,400 B2 | 1/2010 | Liow et al. | |

(Continued)

OTHER PUBLICATIONS

Brown, M. et al., "Automatic panoramic image stitching using invariant features", International Journal of Computer Vision, 74, 1 (2007), pp. 59-73.

*Primary Examiner* — Abderrahim Merouan
(74) *Attorney, Agent, or Firm* — Lerner, David, Littenberg, Krumholz & Mentlik, LLP

(57) ABSTRACT

Apparatuses and methods for capturing and generating composite images. In various aspects, the invention provides apparatuses and methods for correcting position information of captured images received by position sensors based on alignment of overlapping images. Corrected position information is then taken into account when displaying the locations of captured images on a display for providing guidance to users for generating composite images.

30 Claims, 11 Drawing Sheets

(56) References Cited

U.S. PATENT DOCUMENTS

| | | | |
|---|---|---|---|
| 8,131,113 B1* | 3/2012 | Jin | 382/284 |
| 2004/0189849 A1* | 9/2004 | Hofer | G03B 37/04 348/333.03 |
| 2007/0025723 A1* | 2/2007 | Baudisch et al. | 396/287 |
| 2007/0147812 A1 | 6/2007 | Nenonen et al. | |
| 2008/0143820 A1* | 6/2008 | Peterson | 348/36 |
| 2009/0021576 A1 | 1/2009 | Linder et al. | |
| 2010/0265314 A1* | 10/2010 | Nakashio | 348/36 |
| 2011/0096136 A1* | 4/2011 | Liu et al. | 348/14.07 |
| 2011/0216935 A1* | 9/2011 | Mays et al. | 382/100 |
| 2011/0234750 A1 | 9/2011 | Lai et al. | |
| 2012/0075412 A1* | 3/2012 | Miyamoto et al. | 348/36 |
| 2012/0300020 A1 | 11/2012 | Arth et al. | |
| 2012/0307000 A1* | 12/2012 | Doepke et al. | 348/36 |
| 2013/0100240 A1* | 4/2013 | Liu et al. | 348/14.08 |
| 2013/0141524 A1 | 6/2013 | Karunamuni et al. | |
| 2013/0314442 A1* | 11/2013 | Langlotz et al. | 345/633 |

* cited by examiner

METHODS AND APPARATUS FOR GENERATING COMPOSITE IMAGES

TECHNICAL FIELD

The technology disclosed herein relates to the generation of composite images. Particular embodiments provide methods and apparatus for image generation and manipulation.

BACKGROUND

Many people use cameras and other devices that include imaging functions (generally "imaging apparatuses") to create composite images from individual shots of a single scene. Composite images may capture a wider field of view than may be available in a single image and may also show parts of a scene that would not normally be visible in any single image. For example, a composite image may capture a 360 degree view.

With the advent of digital photography, the process of generating and assembling images into a composite image has been greatly simplified. As mobile devices increase in computing power, mobile devices have added many features and functions, such as the ability to acquire, edit, and distribute images. For instance, many mobile computing devices, including mobile phones and tablets, now have cameras and image sensors that can capture images at a high resolution. Some cameras now have significant computing power which may be applied for processing image data.

Current methods for generating composite images may provide less than optimal results. For instance, when images not taken from the same place are used, parallax errors can occur in the generated image. If not enough images are available, there may be gaps in the resulting composite image. If the images taken do not overlap sufficiently, then it may be difficult to assemble the captured images into a quality composite image.

Some applications for generating composite images use data from video images to generate the composite images. This has the disadvantage that video images typically have far less resolution as compared to still images and also that video images cannot take full advantage of the range of exposure options available for still images.

Some applications for generating composite images require users to capture images by following a line on the screen and slowly moving an imaging apparatus in accordance with on screen instructions. If the instructions are not properly followed, images generated may be distorted with artifacts.

Thus, there is an on-going need for an improved method and apparatus for capturing composite images.

BRIEF SUMMARY OF THE INVENTION

In various aspects, the invention provides apparatuses and methods. For example, the invention provides apparatuses and methods for capturing images that may be used for generating composite images.

One aspect of the invention provides a method for assisting a user to acquire a set of images suitable for combination into a composite image. The method comprises operating an imaging device to acquire an image; recording an orientation of the imaging device corresponding to the image; displaying a real-time view through a lens of the imaging device; and superposing on the real time view indicia indicating a portion or portions of the real time view corresponding to the acquired images. The method may be repeated for subsequent acquired images. The method may further comprise determining an extent and/or quality of overlap between different acquired images and optionally displaying indicia in the real time image indicative of the extent and/or quality of overlap.

Another aspect of the invention provides an apparatus for capturing images used for generating a composite image of a scene, the apparatus comprises an image sensor for capturing images; a position and orientation sensor for determining the apparatus' position and orientation when the images are captured; a processor for associating the apparatus' position and orientation when each of the images is captured with such image; a display for displaying representations of the captured images in accordance with the associated positions. The display provides controls for manipulating the representations.

Another aspect of the invention provides a method for correcting position and orientation information of images captured with an imaging apparatus, the method performed by a processor and comprising matching features on the captured images having overlapping segments, creating a correction factor based on the matched features, and correcting position and orientation information associated with each captured image based on the correction factor.

Another aspect of the invention provides a method for capturing images useful for generating a composite image of a scene using an imaging apparatus having a display. The method is performed by a processor and comprises associating position and orientation information of the imaging apparatus when at least two of the images are captured with the applicable image; correcting position information of the at least two images based on overlap between the captured images to yield corrected position information and; providing the display with information for displaying representations of the captured images based on corrected position information.

Another aspect of the invention provides computer-readable software stored on a tangible medium adapted for causing a processor on an imaging apparatus to: match features on images captured by the imaging apparatus having overlapping segments; creating a correction factor based on the matched features; and correcting position information associated with each captured image based on the correction factor.

In addition to the exemplary aspects and embodiments described above, further aspects and embodiments will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
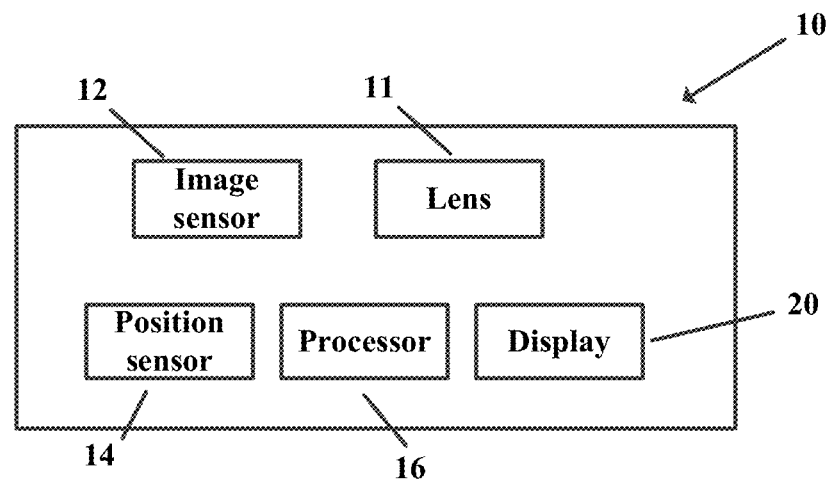
FIG. 1 illustrates the components of an imaging apparatus according to one example embodiment of the invention.

FIG. 1 illustrates the components of an imaging apparatus 10 according to one example embodiment of the invention. In this embodiment, imaging apparatus 10 comprises a lens 11, an image sensor 12, a position sensor 14, a processor 16, and a display 20. In other embodiments, processor 16 and/or display 20 may be in separate housings from position sensor 14 and image sensor 12. In one embodiment, imaging apparatus 10 is a mobile phone. In another embodiment, imaging apparatus 10 is a smart phone, tablet, or portable computer. In further embodiments, imaging apparatus 10 is a camera. In yet other embodiments, imaging apparatus 10 is a digital single-lens reflex camera. In other embodiments, imaging apparatus 10 is a mirror-less camera.

Image sensor 12 converts optical images into electronic image data. The images result from exposure of image sensor 12 to light through lens 11. Image sensor 12 may employ any suitable technology for converting optical images into electronic data. In one embodiment, image sensor 12 is a digital charge-coupled device (CCD). In another embodiment, image sensor 12 is a complementary metal-oxide-semiconductor (CMOS) active pixel sensor. In other embodiments, image sensor 12 is a hybrid of CCD/CMOS architecture.

Lens 11 may be permanently fixed to imaging apparatus 10. Lens 11 may also be interchangeable with lens of different focal lengths, apertures, and other properties. Lens 11 may be made of glass, quartz glass, acrylic, or other suitable materials for focussing light onto image sensor 12.

Position sensor 14 provides information about the position and orientation of imaging apparatus 10 when images are captured by imaging apparatus 10. Position sensor 14 may comprise one or more position-sensing technologies. In one embodiment, position sensor 14 comprises a gyroscope. In another embodiment, position sensor 14 comprises an accelerometer. In a further embodiment, position sensor 14 comprises a tilt sensor. In some embodiments position sensor 14 comprises a global positioning system (GPS) sensor. In other embodiments, position sensor 14 comprises a combination of two or more of the above.

Processor 16 is responsible for processing image data from image sensor 12. Processor 16 may also process position information from position sensor 14. Processor 16 may further provide display data to display 20.

Display 20 on imaging apparatus 10 is responsible for displaying images based on electronic data provided to it. Display 20 may comprise any suitable display technology. In one embodiment, display 20 comprises a liquid crystal display. In another embodiment, display 20 comprises an organic light-emitting diode display. Other materials know to a person skilled in the art in light of the present disclosure may be used for display 20. In some embodiments, display 20 responds to touch by a user. For example, display 20 may comprise a resistive touchscreen, a capacitive touch screen, a multi-touch screen or the like.

Figure 2:
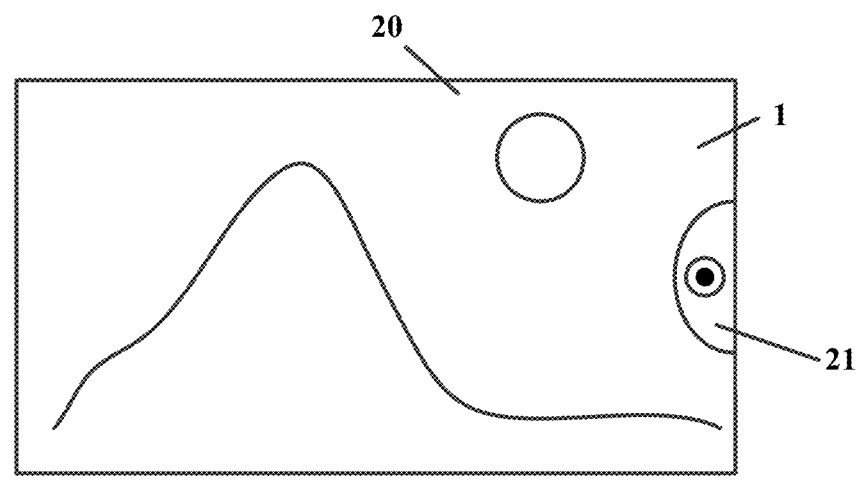
FIG. 2 illustrates a display of the apparatus of FIG. 1 where the display is being operated to act as a viewfinder.

Display 20 may be used as a viewfinder to show live images of a scene 1 (see FIG. 2). FIG. 2 illustrates display 20 acting as a viewfinder with a shutter button control 21 for capturing still images of a scene. In one embodiment, shutter button 21 is always present on display 20. In another embodiment, shutter button 21 appears when user presses display 20. In yet other embodiments, imaging apparatus 10 may comprise a physical shutter button for capturing images. Upon activating shutter button 21, image sensor 12 is operated to capture an image and sends image data of the image exposed to image sensor 12 to processor 16 and the image data is saved to memory of imaging apparatus 10.

Apparatus according to some embodiments of the invention is configured to assist a user in acquiring a set of still images that are well suited to being combined into a composite image. The composite image displays an area of a scene that is larger than the areas depicted in the individual still images. The apparatus may be configured to assist the user, for example, by indicating what parts of a scene the user has already acquired still images of. The apparatus may be further configured to indicate whether the acquired still images overlap in a good way.

By supplementing the live images on display 20 with information from other sensors of imaging apparatus 10, display 20 can be used as an augmented reality viewfinder. In one embodiment, position information from position sensor 14 is shown on display 20 with presentations of captured images.

The viewfinder function of display 20 may be started in a wide range of ways including:

by a user turning on imaging apparatus 10;

by a user operating a control; and/or by launching a software application stored in the memory of imaging apparatus 10, which may be done by user interacting with the user interface on display 20 or by the activation of a physical control.

In one embodiment, display 20 shows live images of scene 1. In this mode, image sensor 12 may provide image data of images captured in real-time to processor 16. Processor 16 in turn provides the image data to display 20. In another embodiment, image sensor 12 provides image data of images captured in real-time to a designated image data processor which in turn provides the image data to display 20.

Live images may be shown on display 20 at a quality lower than captured images. In some embodiments, captured images have a high resolution, e.g. a resolution in excess of 10 megapixels per image while the displayed live view image may have a lower resolution, e.g. the displayed live view images may have on order of 1 megapixel. In another embodiment, live images shown on display 20 are at a quality that is the same as the captured images. In other embodiments, quality of the live images shown on display 20 is variable based on the available resources in imaging apparatus 10.

Representations of captured images may be displayed on display 20 at a lower resolution than actual captured images. In some embodiments captured images are downsampled to a resolution of display 20 or a lower resolution and the downsampled captured images are used to provide representations of captured images as display 20. In other embodiments, representations of captured images are displayed on display 20 at a resolution that is the same as the actual captured images. In yet other embodiments, representations of captured images are shown on display 20 at variable resolutions depending on available resources in imaging apparatus 10.

In one embodiment, images displayed on display 20 for live view of scene 1 are stored temporarily in memory of imaging apparatus 10. In other embodiments, such images are saved in memory of imaging apparatus 10.

When a user activates shutter button 21, the image shown on display 20 is captured and saved onto the memory of imaging apparatus 10. The captured still image is typically significantly higher in resolution than the real time live image displayed on display 20. The still image may be captured using exposure parameters (e.g. exposure time and/or aperture setting) that are different from the real time images displayed on display 20. Captured images may be saved on the internal memory of imaging apparatus 10 and/or on external memory connected to imaging apparatus 10, such as memory cards, including flash memory cards, on an external device connected to imaging apparatus 10 by way of a wired or wireless data connection etc. In one embodiment, captured images are stored temporarily in memory of imaging apparatus 10 until a user causes apparatus 10 to generate a composite image. Such captured images may be automatically deleted if the user does not generate a composite image before switching off a composite image function of apparatus 10. In some embodiments apparatus 10 is configured to prompt the user to indicate whether or not stored captured images should be retained.

In one embodiment, when imaging apparatus 10 captures an image, a system timestamp is associated with the captured image. This timestamp is matched to the position information from position sensor 14 of imaging apparatus 10 when the image was captured. The matched information is stored in a data structure that uniquely associates the image, the timestamp, and the position information. In other embodiments, image data, the timestamp, and position information from position sensor 14 are stored temporarily in memory in imaging apparatus 10 for use by processor 16 in calculating overlap and correction. Such information may be deleted upon the user choosing not to generate a composite image based on captured images.

In one embodiment, display 20 shows representations of captured images superposed on the live image. The representations allow a user to see the areas of the scene being depicted in the live image that have already been acquired as captured images. The representations may take a wide variety of forms including:

markers showing the locations of captured images on display 20;

frames showing the locations of captured images;

different image treatments (e.g. shading, colouring, hatching or the like) that makes regions corresponding to the captured images visually distinctive;

image data from the captured images; and any combinations of the above.

The regions in the live image that correspond to captured images may be determined using information from position sensor 14 that is associated with the captured images and information from position sensor 14 that indicates a current position and orientation of imaging apparatus 10.

Representations of captured images may be shown with perspective distortion to account for differences between the current attitude of imaging apparatus 10 and the attitudes of display imaging apparatus 10 at the times when the captured images were acquired. The perspective distortion may be generated by performing 3D rotations of viewports corresponding to the captured images as described above and projecting the rotated viewports into a plane corresponding to the current live view image.

The positioning of representations of captured images in relation to the live view does not need to be as good as the relative positioning of images being combined into a composite image. The live view image will typically have a relatively low resolution as compared to the captured images. Also, slight deviations in position of the representation(s) of the captured images from the correct locations relative to the live view image will not matter as long as they are not distracting to a viewer.

A simple example embodiment assumes that imaging apparatus 10 will be at the same general position for the acquisition of all images being acquired for possible inclusion in a composite image. Position sensor 14 detects the attitude (orientation in 3D space) for each captured image. Each captured image may be associated with a viewport which typically has the form of the base of a rectangular pyramid having a point at the location of imaging apparatus 10. The pyramid base (which may be called a "view frustum") represents the field of view of the captured image. The angles made by the sides of the pyramid depend on the size of image sensor 12 and the characteristics of lens 11. In some embodiments the sizes of viewports are determined by settable parameters which may be changed to allow operation with different apparatus 10 and/or different lenses 11.

A viewport may be specified by a vector direction corresponding to the attitude of imaging apparatus 10 at the time an image is captured. In some embodiments an angle of rotation (corresponding to tilt of imaging apparatus 10 relative to the horizon) may also be specified.

The representation of a captured image in the live view may be determined by applying a rotation transform centered on the location of imaging apparatus 10 to the viewport (e.g. pyramid base). The rotation transform may comprise a homomorphic transformation. The rotation transform may, for example, be represented by a 3-D rotation matrix that provides information about the roll, pitch, and yaw of imaging apparatus 10. The direction and amount of rotation may be equal to a difference between the attitude of imaging apparatus 10 when the image was captured and the current attitude of imaging apparatus 10. The transformed viewport corresponds to the region of the live image associated with the captured image.

In some embodiments position sensors 14 are of types which have outputs that are subject to drift. For example, the outputs of the accelerometer sensors that sense rotation in many mobile telephones are subject to drift. In such cases the difference between the current attitude of imaging apparatus 10 as measured by sensor 14 and the attitude of imaging apparatus 10 when an image was captured may include an error arising from such drift or other inaccuracy of position sensor 14. Accordingly, some embodiments refine the transformation to be applied to the viewport to obtain more accurate alignment between the viewport and the live image. The refinement may comprise matching features of the live image with features of the captured image. For example, one method that may be applied to match features of the live image with corresponding features of captured images is the local feature matching method known as scale-invariant feature transform (SIFT). Details of SIFT are described in U.S. Pat. No. 6,711,293 which is hereby incorporated herein by reference for all purposes.

In some embodiments, when image data of captured images is provided to processor 16, processor 16 performs extraction of local invariant features for each of the captured images. The features in a captured image may then be matched between the captured image and the live view image using a suitable approach such as approximate nearest-neighbour matching. Readings of position sensor 14 may be applied to provide an initial estimate of the alignment between each image and the live view. Processor 16 may then use the matches of local invariant features to create a homography transformation between the captured image and the live view. A homography transformation can map between the positions of objects in two images taken from the same point.

Use of feature matching to solve for parameters of a homographic transformation is known to the persons skilled in the art. For example, approaches for doing so using SIFT is described in Matthew Brown and David G. Lowe, "Automatic panoramic image stitching using invariant features," International Journal of Computer Vision, 74, 1 (2007), pp. 59-73. The homography transform may be applied to map boundaries of a captured image onto the live view. In one embodiment, the resolution of location invariant feature matching is sub-pixel. In other embodiments, the resolution of local feature matching is rounded off to the closest pixel.

In some embodiments, matching of features between captured images and the live view images is used to correct position information provided by position sensor 14 for drift. For example, the attitude of imaging apparatus 10 for a specific captured image (e.g. a reference image which could be a first captured image) may be identified as a reference attitude. The attitude of imaging apparatus 10 may be corrected in real time based on matching of features between the live view image and the reference image (and/or between the live view image and one or more other captured images that correspond to known attitude(s) relative to the reference image). In some embodiments a null transformation (e.g. a matrix of zero rotation) is associated with a reference image by imaging apparatus 10 and any subsequent captured image is assigned an attitude that is relative to the first based on position information determined by position sensor 14 when each subsequent image is taken.

As the attitude of imaging apparatus 10 is changed (e.g. as imaging apparatus 10 is panned or tilted), data regarding position of imaging apparatus 10 is collected by position sensor 14 and provided to processor 16. In one embodiment, the position of the representation of each captured image as shown on display 20 is continuously updated based on data from position sensor 14 to maintain its relative position to the current attitude of imaging apparatus 10.

By continuously updating the attitude of imaging apparatus 10 while maintaining position information for each captured image, display 20 can show representations of captured images in correct positions relative to the live view image which corresponds to the current positioning of imaging apparatus 10. By using matching between images (e.g. between one or more captured images and a live view image and/or between one or more other live view images and a live view image) the position information may be continuously corrected so that the representations are displayed in correct locations relative to the live view image.

In some embodiments, additional information relating to captured images and/or controls for working with captured images are provided on display 20. The additional information and/or controls relating to each captured image may be located with the indicia corresponding to the captured image. For example, the controls may comprise touch-sensitive regions co-located with the indicia.

Figure 3A:
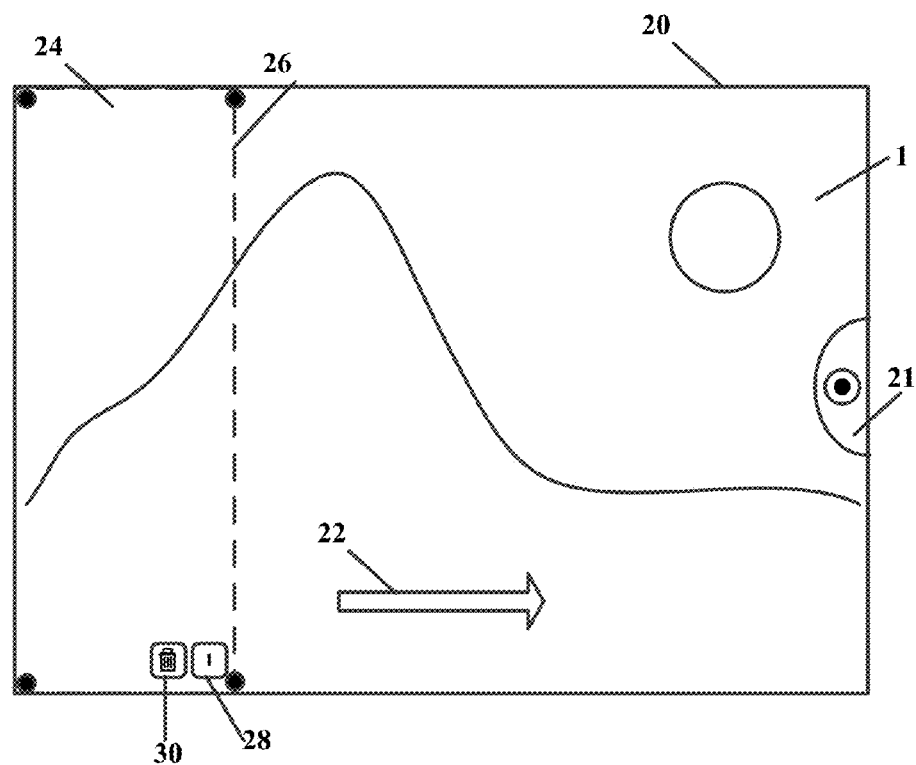
FIG. 3A illustrates a display of an imaging apparatus with a representation of one image of a scene superimposed on the live image shown on the display according to one example embodiment of the invention.
Figure 3B:
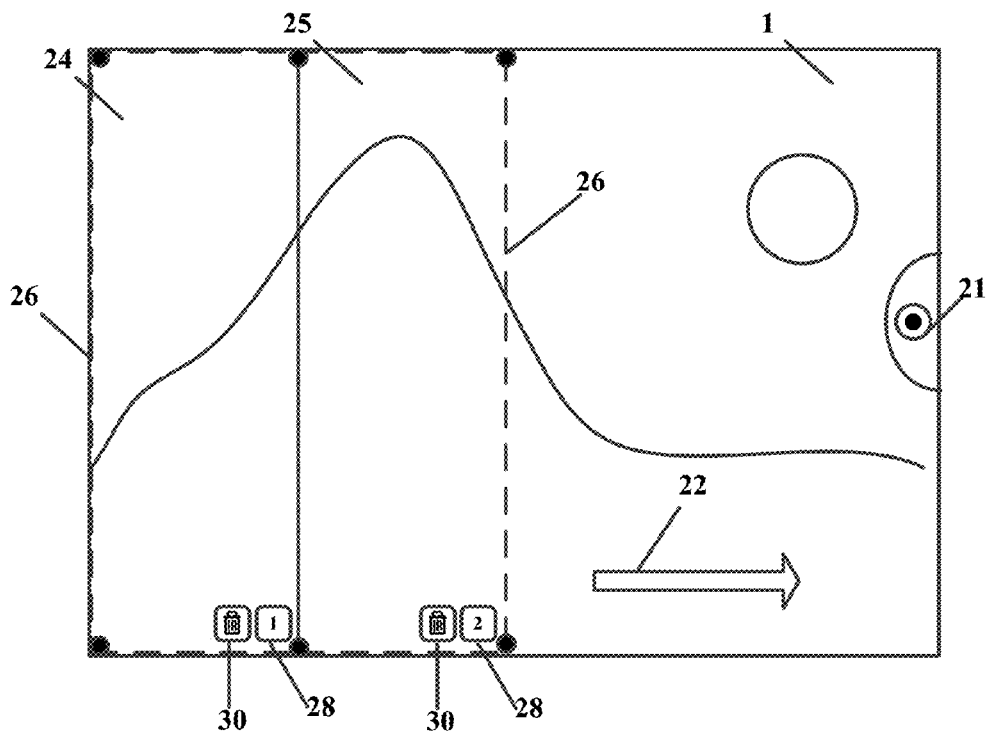
FIG. 3B illustrates the display of FIG. 3A with representations of two images of the scene superimposed on the live image shown on the display.
Figure 3C:
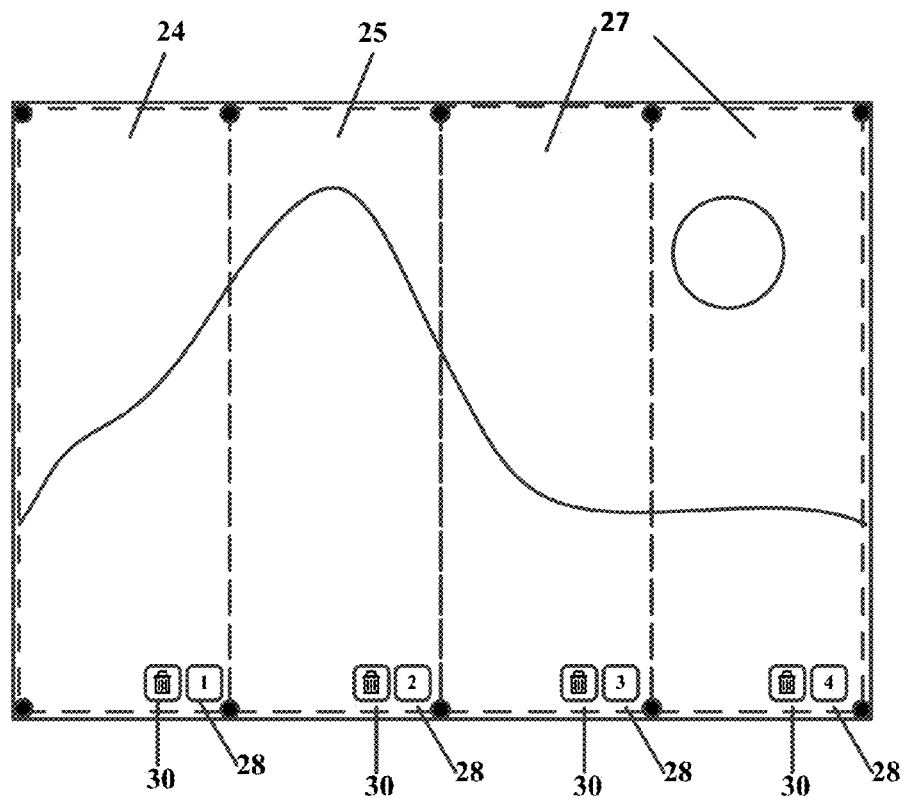
FIG. 3C illustrates the display of FIG. 3A with representations of four images covering the scene superimposed on the live image shown on the display.
Figure 3D:
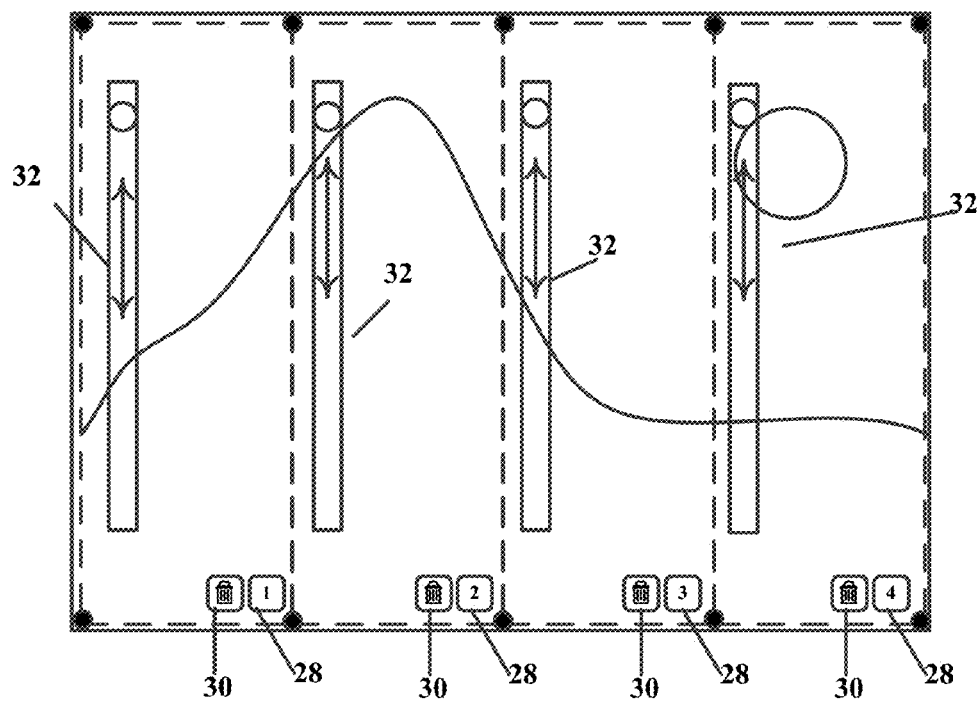
FIG. 3D illustrates a display of an imaging apparatus with control bars to adjust the opacity of representations of the captured images shown on the display according to one example embodiment of the invention.

FIGS. 3A to 3F illustrate display 20 acting as an augmented reality viewfinder of imaging apparatus 10 according to one example embodiment. FIG. 3A illustrates a display 20 of imaging apparatus 10 with a representation of one image of scene 1 superimposed on the live image shown on display 20. FIG. 3B illustrates display 20 of imaging apparatus 10 of FIG. 3A with representations of two images of scene 1 superimposed on the live image shown on display 20. FIG. 3C illustrates display 20 of imaging apparatus 10 of FIG. 3A with representations of four images covering scene 1 superimposed on the live image shown on display 20. FIG. 3D illustrates display 20 of imaging apparatus 10 with control bars to adjust opacity of representations of the captured images.

Referring to FIG. 3A to 3C, as the user pans imaging apparatus 10 across scene 1 in a direction 22, images of different parts of scene 1 are captured. In one embodiment, images are captured by user activating shutter button 21. In another embodiment, images are captured by user moving imaging apparatus 10 according to directions shown on display 20. The shutter may be automatically triggered to capture images at various points in the motion. In further embodiments, the directions are selected by user of imaging apparatus 10.

In FIG. 3A, a first image 24 is captured. Image sensor 12 sends image data of first image 24 to processor 16 which saves the image data to the memory of imaging apparatus 10. Position information of imaging apparatus 10, when first image 24 is captured, is recorded by position sensor 14, and such position information is stored in memory of imaging apparatus 10. Processor 16 then instructs display 20 to show representation of first image 24 as an image superimposed on the live image of scene 1. As imaging apparatus 10 is moved, apparatus 10 automatically moves the representation of first image 24 relative to the displayed live image so that the representation of first image 24 remains in the correct position relative to the live image as long as apparatus 10 is oriented such that the live view includes part or all of the scene captured in first image 24.

In the embodiment illustrated in FIG. 3A, representations of captured images such as first image 24 are shown with broken line borders 26. In other embodiments, representations of the captured images may be in the form of frames having coloured borders or a patterned lined border, or by any other markers known to a person skilled in the art in light of the present disclosure. In yet other embodiments, captured images may be displayed as boxes rather than as actual image content from the captured image. In this embodiment, an image identifier 28 is superimposed on first image 24. Different image identifiers may be displayed in association with representations of different captured images. In some embodiments image identifiers 28 comprise alphabetic characters, numbers, alphanumeric sequences or other sequential indicators.

In FIG. 3B, a second image 25 is then captured. Image sensor 12 sends image data of second image 25 to processor 16 which saves the image data to the memory of imaging apparatus 10. Position information of imaging apparatus 10 when second image 25 is taken is recorded by position sensor 14, and such position information is stored in memory of imaging apparatus 10. Processor 16 then instructs display 20 to show a representation of second image 25 in a location in the live image corresponding to second image 25. In the illustrated example, a representation of second image 25 is displayed to the right of the representation of first image 24 (based on position information of imaging apparatus 10 when first image 24 and second image 25 were captured) and superimposed on the live image of scene 1 as shown on display 20.

As FIG. 3C illustrates, representations of first image 24, second image 25, and subsequent images 27 completely cover the live image of scene 1 shown on display 20. In other embodiments, representations of first image 24, second image 25, and other subsequent images 27 are displayed as thumbnails over the live image of scene 1 shown on display 20. Location of the representations of subsequent images 27 on display 20 is determined by position information provided by position sensor 14. In some embodiments the selection of which images to capture, in which order are completed within the control of a user who may point apparatus 10 in various directions and capture images of portions of scene 1 by operating shutter control 21. Apparatus 10 remembers the orientation of apparatus 10 when such images were captured and displays representations so that the user can see where additional representations should be captured to allow creation of a composite image to cover a desired area of a scene.

Imaging apparatus 10 may provide for controls to manipulate representations of captured images as shown on display 20 and/or to manipulate the captured images themselves. Such controls may be implemented by software executed by processor 16. In FIGS. 3A to 3C, display 20 shows a delete button 30. Each delete button 30 is associated with a captured image. Delete buttons 30 are located on or adjacent to the representation of each captured image. A user can readily delete any captured image for which a representation of the captured image is displayed on display 20 by actuating the corresponding delete button. In other embodiment, delete button 30 comprises a physical control on imaging apparatus 10.

In one embodiment, when delete button 30 is activated, the corresponding image is permanently deleted from the memory of imaging apparatus 10. In other embodiments, activation of delete button 30 leads to deletion of the representation of the selected image from being shown on display 20 only. The image data for the captured image may remain stored in imaging apparatus 10 but the image may be excluded from a composite image.

In other embodiments, imaging apparatus 10 may have other software to provide for other functionalities to be accessed by controls shown on display 20 for manipulation of representations of the captured images. These additional controls may also be displayed in positions that are determined by positions of the captured images to which they relate. For example, these additional controls may be displayed along boundaries of representations of the captured images.

In one embodiment, interaction with representations of captured images on display 20 by users is accomplished by raytracing from the 2-D location of a touch on display 22 to a 3-D line representation in the space shown on display 20. The 3-D ray is then tested for intersection with any of the 3-D objects that represent the captured images, or the buttons or other interactive objects that are attached to them. In this embodiment, a 2-D location on display 20 corresponds to a ray in space which has infinite number of points in one direction. The far plane of each frustum of a captured image is set to a distance equivalent to the focal distance of imaging apparatus 10. When calculating intersection, the far plane constrains the 3-D ray. As such, when interacting with images shown on display 20, users are pointing to a location on the live view image to select a particular captured image, rather than a static display of the captured images.

As illustrated in FIG. 3D, in one embodiment, display 20 may include controls 32 operable to modify opacity of the displayed representations of captured images that are superimposed on the live image shown on display 20. In the embodiment shown in FIG. 3D, opacity modifiers 32 comprise toggle controls that allow users to switch between two states as to how the captured images are displayed on display 20, namely transparent (to show the live view image) or opaque (to show the captured image).

In another example embodiment, opacity modifiers 32 comprise a toggle within a bar that is responsive to touch. As the user activates the toggle, processor 16 interprets the instruction from user and instructs display 20 to display the selected representation of the captured image with the selected degree of opacity.

Figure 3E:
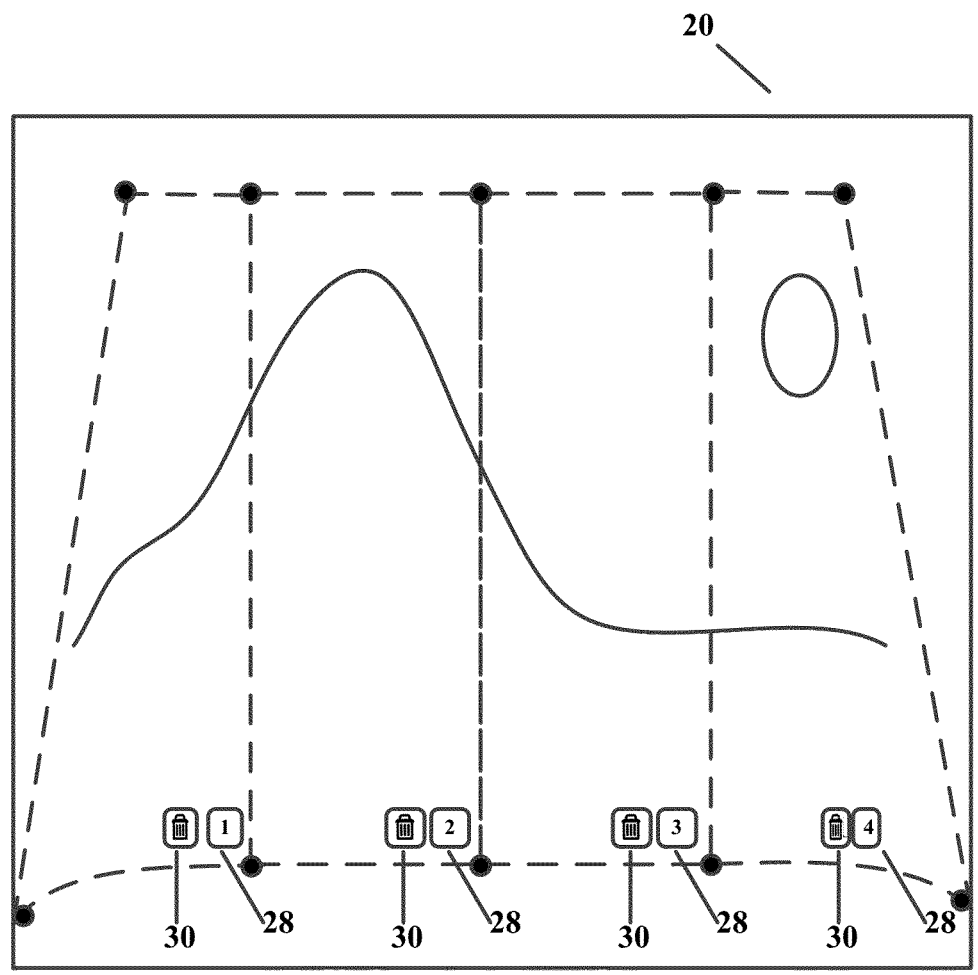
FIG. 3E illustrates a display of an imaging apparatus where representations of captured images are displayed with perspective distortion based on position information of the imaging apparatus when images were captured according to one example embodiment of the invention.

FIG. 3E illustrates display 20 of imaging apparatus 10 according to an example embodiment where representations of captured images are displayed with perspective distortion based on position information of imaging apparatus as stored in memory of imaging apparatus 10 after first image 24, second image 25, and subsequent images 27 are captured according to one example embodiment. Position sensor 14 provides real-time position information for imaging apparatus 10 as imaging apparatus 10 is pointed in different directions. Processor 16 instructs display 20 to show representations of first image 24, second image 25, and subsequent images 27 relative to current real-time position of imaging apparatus 10.

A user can see whether the captured images appear to cover all of a desired composite image by viewing display 20. The user may need to point imaging apparatus 10 in various directions to review the entire area desired for a composite image. In some embodiment, imaging apparatus 10 is configured to determine whether a sufficient number of images have been taken so that a composite image can be generated from the captured images. In some embodiments, imaging apparatus 10 is configured to determine whether there are holes left between the images of a set of captured images. Imaging apparatus 10 may be configured to warn a user if such holes exist and/or to highlight the holes on display 20.

In an exemplary embodiment, imaging apparatus 10 is configured to evaluate and provide information as to the amount and/or quality of overlap between captured images.

This allows imaging apparatus 10 to allow a user to identify captured images that do not overlap sufficiently with adjacent captured images to be stitched together with the adjacent captured images using image-stitching techniques. The amount of overlap between two adjacent images may be determined using information recorded from position sensor 14 when the images were recorded. For example, the amount of overlap between two captured images may be determined by projecting viewports for the two captured images into a common plane (e.g. a plane perpendicular to a ray that bisects the angle between the 3D directions associated with the captured images). The area of overlap may be directly measured. In another embodiment, one of the captured images is projected into the plane of another captured image for measuring the amount of overlap. In another embodiment, the captured image closest to the current live view image is projected into the plane of the current live view image to calculate the degree of overlap between the current live view image and the previously-captured image. An indicator on apparatus 10 may be automatically controlled in response to the calculated overlap to indicate whether an image captured at the current orientation of apparatus 10 would overlap sufficiently with the closest previously-captured image for successful image stitching.

Most image stitching algorithms identify how to join two images together by determining transformations that align features common to the two images. Thus stitching of images can be more difficult where there is a scarcity of suitable features that can be aligned. In such cases it is desirable to have more overlap between the images to increase the likelihood that enough common features can be found within overlap regions to do a good job of stitching the images together. Where images have a high density of suitable common features, then successful stitching may be performed even with a narrower overlap region.

Some embodiments determine a measure of how readily two overlapping captured images may be stitched together. The measure may be based on a suitable combination of the degree of overlap between the two overlapping captured images, the number and/or density of common features that can be identified in the area of overlap and/or the distance between the identified common features. Imaging apparatus 10 may be configured to indicate on display 20 at least cases where the measure indicates that it will be more difficult to stitch together the images (a situation that may be cured by capturing another image centered on the overlap area).

In one embodiment, to provide guidance to display 20 regarding overlap between captured images, processor 16 computes which of the captured images is nearest to the current attitude of imaging apparatus 10. The three dimensional corners of the nearest image are projected into the coordinate system of the live image representation on display 20. The intersection of the resulting planar surface with the planar surface of the live image shown on display 20 is used to compute the percentage of overlap between the previously captured image and an image that would be captured if imaging apparatus 10 were controlled to capture an image with imaging apparatus 10 in its current attitude. Percentage of overlap between the captured images is checked against thresholds. For example, too much overlap is unnecessary but too little overlap may make it difficult or impossible to stitch together the images. The thresholds may include both a low threshold and a high threshold in some embodiments. The thresholds may comprise pre-defined values based on heuristics.

In some embodiments, Schmitt trigger like behaviour may be used by processor 16 to prevent high frequency oscillations at boundaries of captured images. In one embodiment, the quality of overlap between different captured images is displayed. In a further embodiment, the quality of overlap is categorized into different categories to allow a user to determine whether another image needs to be captured. In yet another embodiment, the categories are poor, acceptable, and optimal.

Figure 3F:
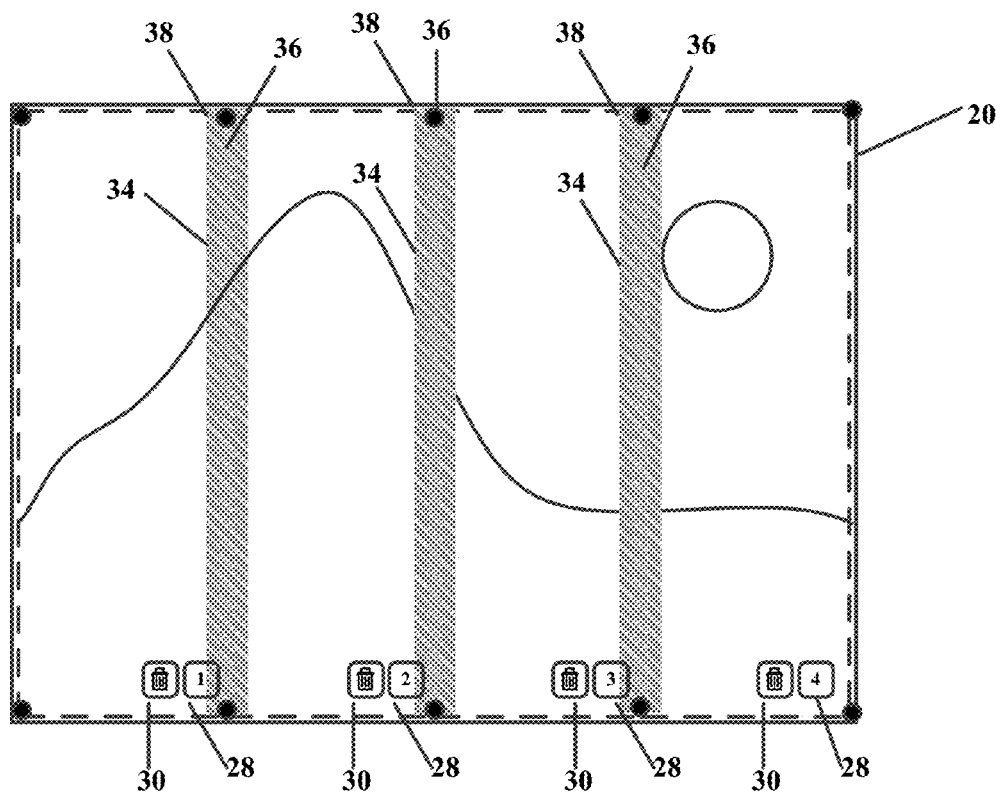
FIG. 3F illustrates a display of an imaging apparatus showing representations of captured images of a scene and indicators of degree of overlap according to one example embodiment of the invention.

FIG. 3F illustrates a display of imaging apparatus 10 showing representations of captured images of scene 1 and indicator of degree of overlap according to one example embodiment. Representations of captured images are displayed on display 20 with overlap bars 34 indicating the degree of overlap between captured images of scene 1. In this embodiment, overlap bars having denser patterns 36 show areas with a high degree of overlap between captured images and overlap bars having less dense patterns 38 show areas with a lower degree of overlap.

Figure 3G:
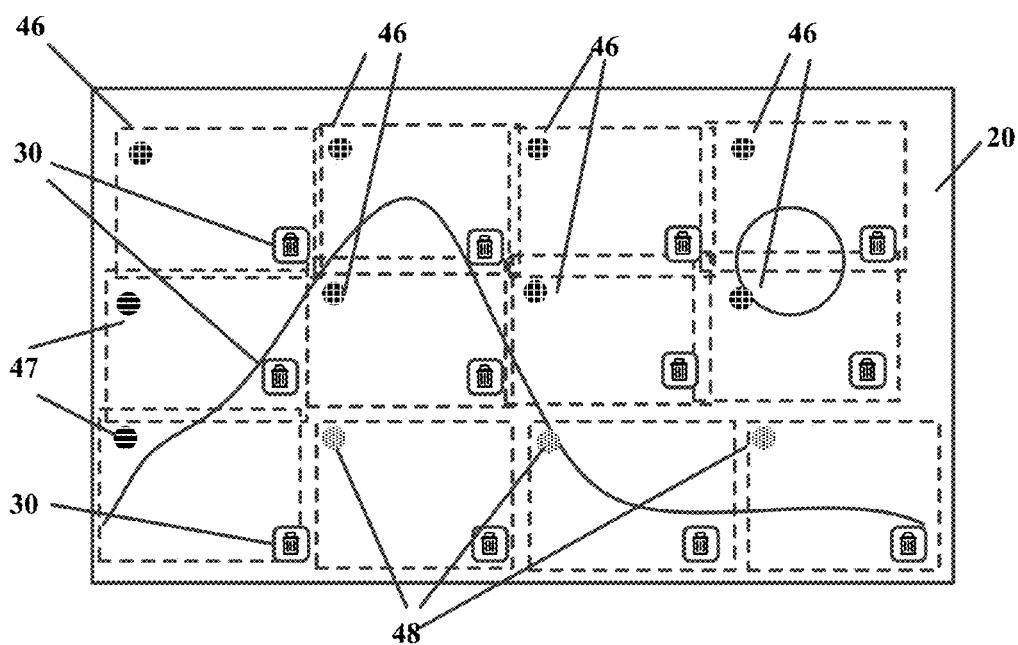
FIG. 3G illustrates a display of an imaging apparatus showing representations of captured image of a scene and indicators of overlap quality according to one example embodiment of the invention.

FIG. 3G illustrates a display of imaging apparatus 10 showing representations of captured image 40 of scene 1 and indicators of overlap quality according to one example embodiment. In this embodiment, imaging apparatus 10 provides overlap indicator 44 superimposed on representations of captured images on display 20 based on degree of overlap calculated by processor 16. In this embodiment, overlap indicators 44 have three different possible patterns, optimal pattern 46, acceptable pattern 47, and poor pattern 48. Processor 16 instructs display 20 to show an appropriate one of these patterns in association with each representation of captured images based on the calculated degree of overlap. In one embodiment, overlap indicators 44 are coloured. The overlap information allows users to determine whether sufficient images have been captured for generating composite image or whether certain images have to be re-taken to improve the quality of the overlap. In this embodiment, representations of captured images displayed on display 20 can be deleted by activating the appropriate delete control 30.

While the embodiment shown in FIG. 3G shows representations of all of the captured images over the top of the live image, in other embodiments, only representations of a subset of the captured images are shown on display 20 overlaying the live view image. For such embodiments, users may need to pan and tilt imaging apparatus 10 to view representations of other captured images. In another embodiment, each captured image has a field of view equal to the live view image.

In some embodiments, once a plurality of images have been captured, feature matching is performed between captured images to further reduce alignment errors between different images of scene 1 and to improve the accuracy with which representations of captured images can be displayed relative to a live view image. In some embodiments such processing may be performed periodically or each time a new image is added to the set of captured images. Such processing may be called a 'bundle adjustment'.

A bundle adjustment may be performed by using matched features between all captured images or at least a number of pairs of the captured images to refine and optimize the position information associated with different captured images. The bundle adjustment may comprise adjusting attitudes associated with different captured images using a least-squares or other optimization approach to identify corrections to the position information which will minimize or reduce misalignment of invariant features among the captured images For example, processor 16 may apply corrections to the 3-D rotation matrix assigned to each captured image. The bundle adjustment may be calculated using an iterative solver to determine a solution for a system of linear equations as known to a person skilled in the art in light of the present disclosure.

Under some circumstances it may become apparent to apparatus 10 that a representation of an image being displayed on display 20 is not correctly positioned on display 20. This may occur, for example, when a bundle adjustment is performed that results in updating the position information associated with one or more captured images and/or when a correction is made to the current position information from position sensor 14 to compensate for drift. It can be distracting for a user to see a representation of a captured image jittering' relative to a displayed live image. To avoid jitter, in some embodiments, corrections are applied smoothly (e.g. in a series of small steps instead of all at once). For example, a correction may be applied smoothly by interpolating between the starting and ending attitudes of each captured image over time. In some embodiments, adjustments to positions of representations of captured images on display 20 are applied smoothly over multiple frames to avoid noticeable jitter.

In one embodiment, processor 16 processes position information of imaging apparatus 10 from position sensor 14 in real time and position of representations of captured images on display 20 are changed in near real time to reflect the change in position of imaging apparatus 10 when display 20 is acting as an augmented reality viewfinder. In other embodiments, visual corrections to representations of captured images may be processed at a lower rate depending on available processing resources in imaging apparatus 10. In another embodiment, visual corrections to captured images are done by processor 16 at a variable rate.

In one embodiment, bundle corrections are performed by a core in processor 16 that also processes image data from image sensor 12. In other embodiments, bundle corrections are performed by a different core in processor 16 from the core that processes image data from image sensor 12. Preferably, bundle corrections are computed by a separate core of processor 16 to avoid slowing real time update of position information of representations 29 of the captured images shown on display 20. Such bundle corrections may be performed on an ongoing basis while other aspects of the disclosed method are executed by other processor cores. In other embodiments, processor 16 instructs display 20 to display representations of captured images and another data processor instructs display 20 to show live images of scene 1.

In one embodiment, at least two images of a scene are captured to create a composite image. The composite image may be a panoramic view of scene 1. In some embodiments, the composite image comprises a sequence of images that complete a 360 degree panorama of scene 1. In such embodiments, processor 16 may match the last image captured to the first image of the circular sequence and correct positioning errors of captured images to form a completed circle.

When bundle adjustment is completed by processor 16, processor 16 may determine the aggregate field of view of images captured using the known angular width and/or height of the field of view for captured images. Processor 16 would recognize a full set of images covering 360 degree view of scene 1 has been taken where horizontal field of view or vertical field of view of captured images is greater than 360 degrees. In one embodiment, display 20 provides indication that a full set of images covering 360 degrees of scene 1 has been taken. Apparatus 10 may be configured to evaluate overlap between the images such that the indication indicates that the set of images all overlap sufficiently with other ones of the images to successfully stitch the images together to yield a 360 degree panoramic image.

Figure 4A:
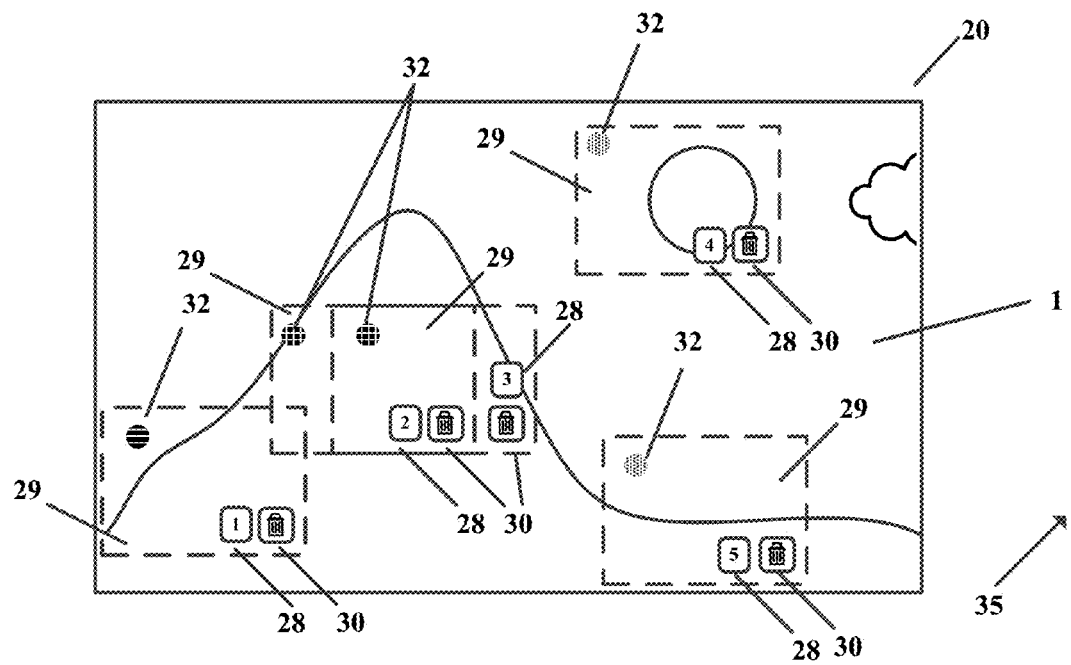
FIG. 4A illustrates a display of an imaging apparatus acting as an augmented reality viewfinder showing representations of captured images and live image of a scene according to one example embodiment of the invention.
Figure 4B:
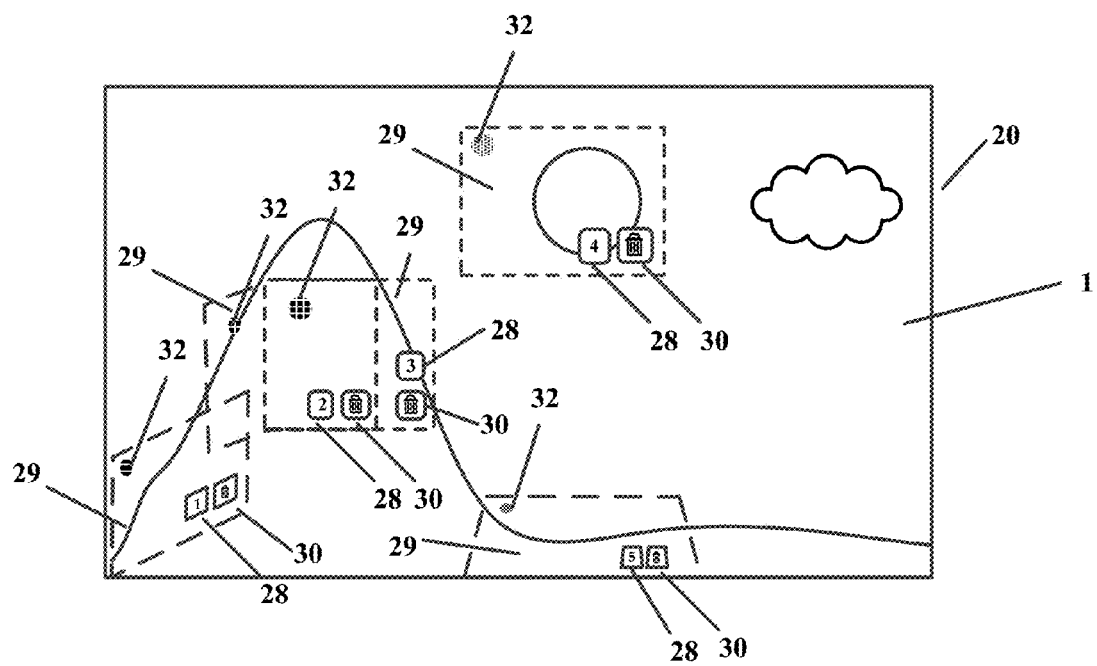
FIG. 4B illustrates the display of FIG. 4A when the imaging apparatus is directed towards a different part of the scene.

FIGS. 4A and 4B illustrates display 20 acting as an augmented reality viewfinder of imaging apparatus 10 showing representations of captured images and live image of scene 1 according to another example embodiment.

FIG. 4A shows representations 29 of five individual captured images of scene 1 as shown on display 20. Each representation 29 of captured image is denoted with image number 28. Processor 16 also instructs display 20 to show overlap indicators 44 in association with each representation 29 of captured images to indicate whether captured image is suitable for use in generating a composite image. In this embodiment, representations 29 of each captured images comprise a frame with a dash-lined border as an overlay on top of live image of scene 1 shown on display 20. In other embodiments, representations 29 of captured images comprise markers on display 20, which may reduce the amount of processing resources used by processor 16 in imaging apparatus 10. In other embodiments, delete button 30 is displayed with representation 29 of each captured image so that users can determine whether to keep or delete certain captured images.

As discussed above, when each image is captured using imaging apparatus 10, position sensor 14 determines the attitude of imaging apparatus 10 when such image is captured and provides such position information to processor 16. Image sensor 12 converts captured images into electronic data and provides it to processor 16. Using the first captured image as a frame of reference, representations 29 of subsequent captured images are shown on display 20 based on position information provided by position sensor 14. As illustrated in FIG. 4A, the image denoted as "1" overlaps slightly with the image denoted as "2", and the images denoted as "2" and "3" overlap significantly. The images denoted as "4" and "5" do not overlap with any other images. By comparing current position information of imaging apparatus 10 (as corrected), imaging apparatus 10 determines which representation 29 of the captured image will be visible on display 20 based on the difference between the current position and the saved position information of each captured image.

In one embodiment, position information from position sensor 14 is first corrected through the use of SIFT, homography transformation, and creation of a correction factor as discussed herein. Locations of representations 29 of captured images as shown over the live image of scene 1 may be based on corrected positional information. In one embodiment, representations 29 of captured images are opaque when super imposed on live image of scene 1 on display 20. In other embodiments, representations 29 of captured images are shown with at least 30% transparency when superimposed on live image of scene 1 of display 20. The degree of transparency of representations 29 of captured images may be adjusted by users in some embodiments.

By displaying representations 29 of captured images on display 20 with live image of scene 1, users can determine whether additional images need to be captured of scene 1 for generating a composite image.

FIG. 4B illustrates the perspective distortion of representations 29 of captured images displayed on display 20 as imaging apparatus 10 changes position. As imaging apparatus 10 is panned to a direction 35, live image of scene 1 as shown on display 20 changes. Position sensor 14 detects the change in the position of imaging apparatus 10 and provides updated position information to processor 16. Processor 16 then updates position information for all representations 29 of captured images as shown on display 20 and instructs display 20 to shift locations of representations 29 of captured images based on the change in position of imaging apparatus 10 as detected by position sensor 14. Based on the change in position of imaging apparatus 10, captured images 29 like those denoted as "1", "2", and "5" in FIG. 4B will be shown with perspective distortion as the live image of scene 1 changes on display 20 in response to a user orientating apparatus 10 in different directions.

In one embodiment, processor 16 instructs display 20 to show captured images with proper perspective distortions based on a 3-D model and position information. In a further embodiment, OpenGL is used by processor 16 for instructing display 20 to show captured images with perspective distortion.

In one embodiment, composite image is created on imaging apparatus 10. In other embodiments, composite images are created on systems other than imaging apparatus 10.

Figure 5:
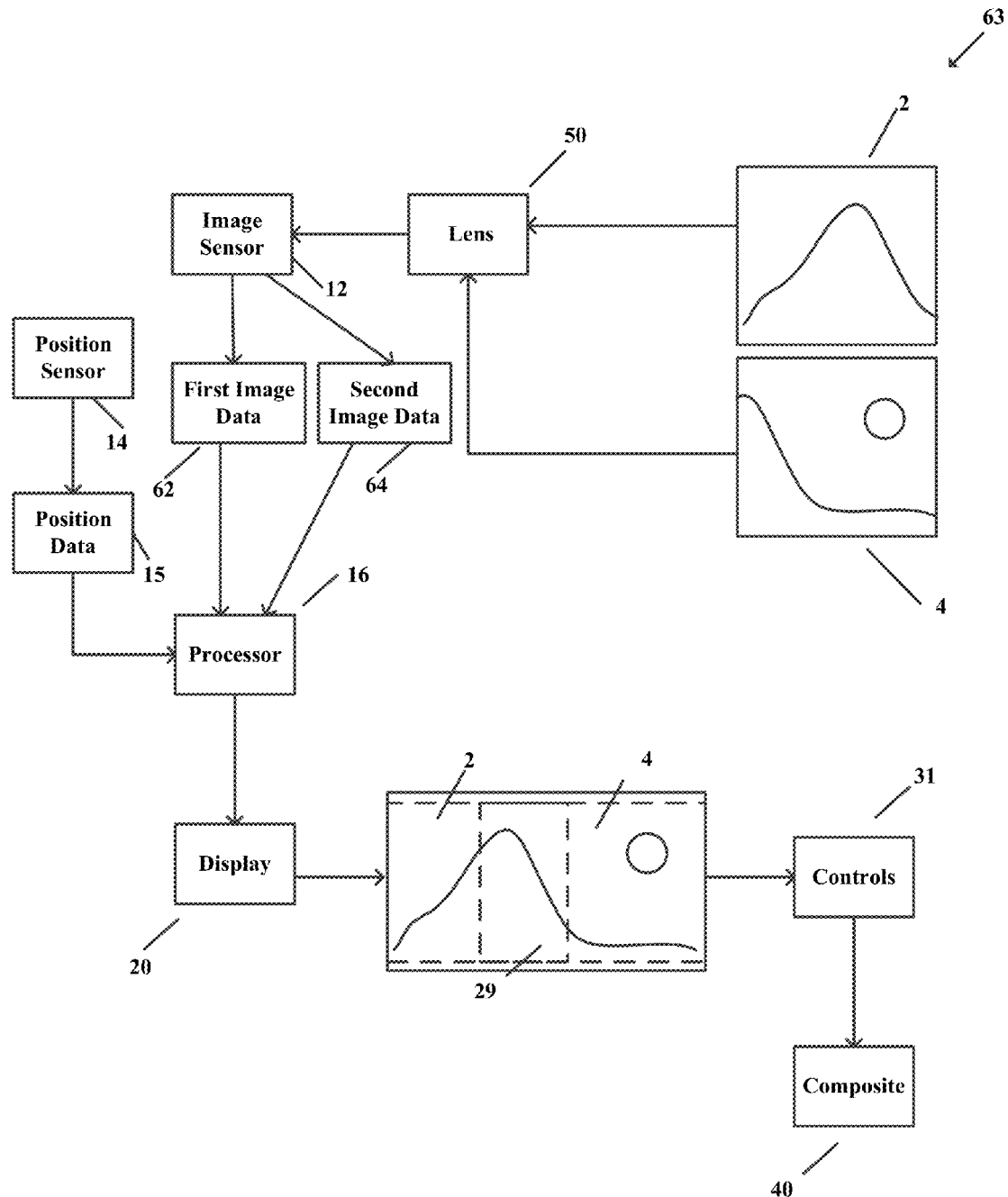
FIG. 5 is a flow chart which illustrates an example method for generating a composite image according to one example embodiment of the invention.

FIG. 5 is a flow chart illustrating an example method 63 for generating a composite image 40 according to one example embodiment. A first image 2 of scene 1 is captured through lens 50 of imaging apparatus 10. Image sensor 12 generates first image data 62 from first image 2. A second image 4 of scene 1 is captured through lens 50 of imaging apparatus 10. Image sensor 12 generates second image data 64 from second image 4. Position sensor 14 captures position information about the position of imaging apparatus 10 when each of first image 2 and second image 4 is captured. Position information 15 relating to the capture of first image 2 and second image 4 is provided to processor 16. First image data 62 and second image data 64 are also provided to processor 16. In one embodiment, processing of image data 62 and 64 and position information 15 for first image 2 and second image 4 is performed by the same processor 16. In other embodiments, the processing may be done by different processors. Processor 16 then instructs display 20 to displays representations 29 of first image 2 and second image 4 based on first image data 62 and second image data 64 having regarding to position information 15 collected by position sensor 14. Processor 16 extracts local invariant features from first image data 62 and second image data 64 and matches and aligns the local invariant features together through image stitching methods known to a person skilled in the art in light of the present disclosure. In one embodiment, SIFT is used by processor 16 for processing and aligning first image data 62 and second image data 64. Imaging apparatus 10 may provide controls 31 to user so that representations 29 of captured images may be manipulated on display 20. User can also use controls 31 to generate a composite image 40 of scene 1 based on first image 2 and second image 4. In other embodiments, further images of scene 1 may be taken and combined with other images accordingly to form composite image 40.

Figure 6:
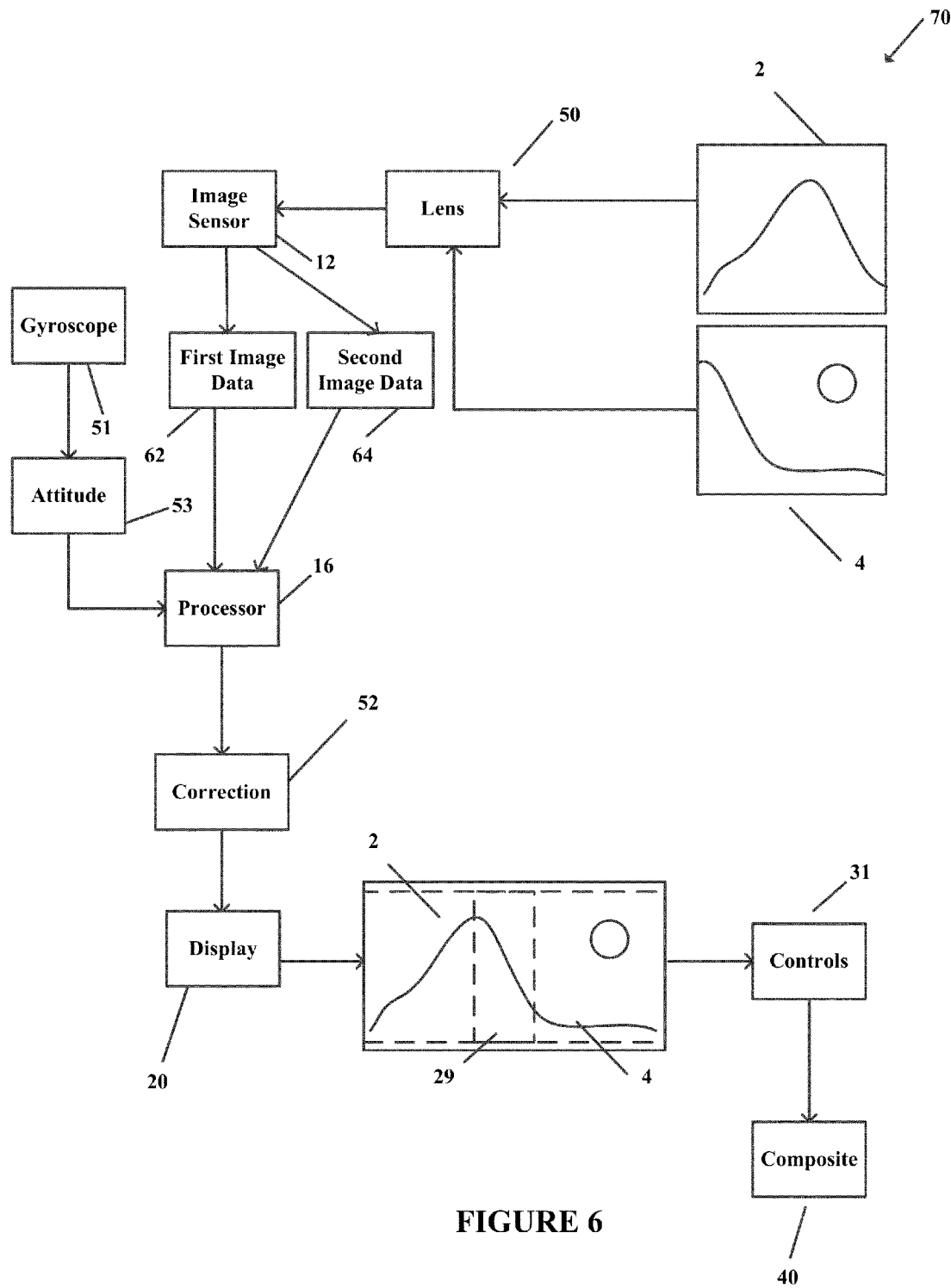
FIG. 6 is a flow chart which illustrates an example method for generating a composite image using data from a gyroscope according to one example embodiment of the invention.

FIG. 6 is a flow chart illustrating an example method 70 for generating composite image 40 according to one example embodiment. First image 2 of scene 1 is captured through lens 50. Image sensor 12 generates first image data 62 from first image 2. Second image 4 of scene 1 is captured through lens 50. Image sensor 12 generates second image data 64 from second image 4. Gyroscope 51 determines attitude 53 of imaging apparatus 10 when each of first image 2 and second image 4 is captured. Attitude 53 relating to the capture of first image 2 and second image 4 from gyroscope 51 is provided to processor 16. First image data 62 and second image data 64 is also provided to processor 16. Processor 16 processes first image data 62 to determine local invariant features of first image 2. Processor 16 processes second image data 64 to determine local invariant features of second image 4. Local invariant features of first image 2 and local invariant features of second image 4 are aligned by processor 16 using methods known to a person skilled in art in light of the present disclosure.

In one embodiment, local invariant features are matched (e.g. using SIFT). Processor 16 then uses the information generated from the matching of local features to undertake correction 52 of attitudes 53 provided by gyroscope 51. Processor 16 may also use information from live view images when generating correction 52. Representations 29 of first image 2 and second image 4 are then displayed on display 20 having regarding to corrected attitudes 53 for first image 2 and second image 4. Once user is satisfied with images displayed on display 20, composite image 40 can be generated based on first image 2, second image 4, and corrected attitude 53 for both images. In other embodiments, further images of scene 1 may be taken and combined with other images accordingly with attitudes 53 from gyroscope 51 to form composite image 40.

Figure 7:
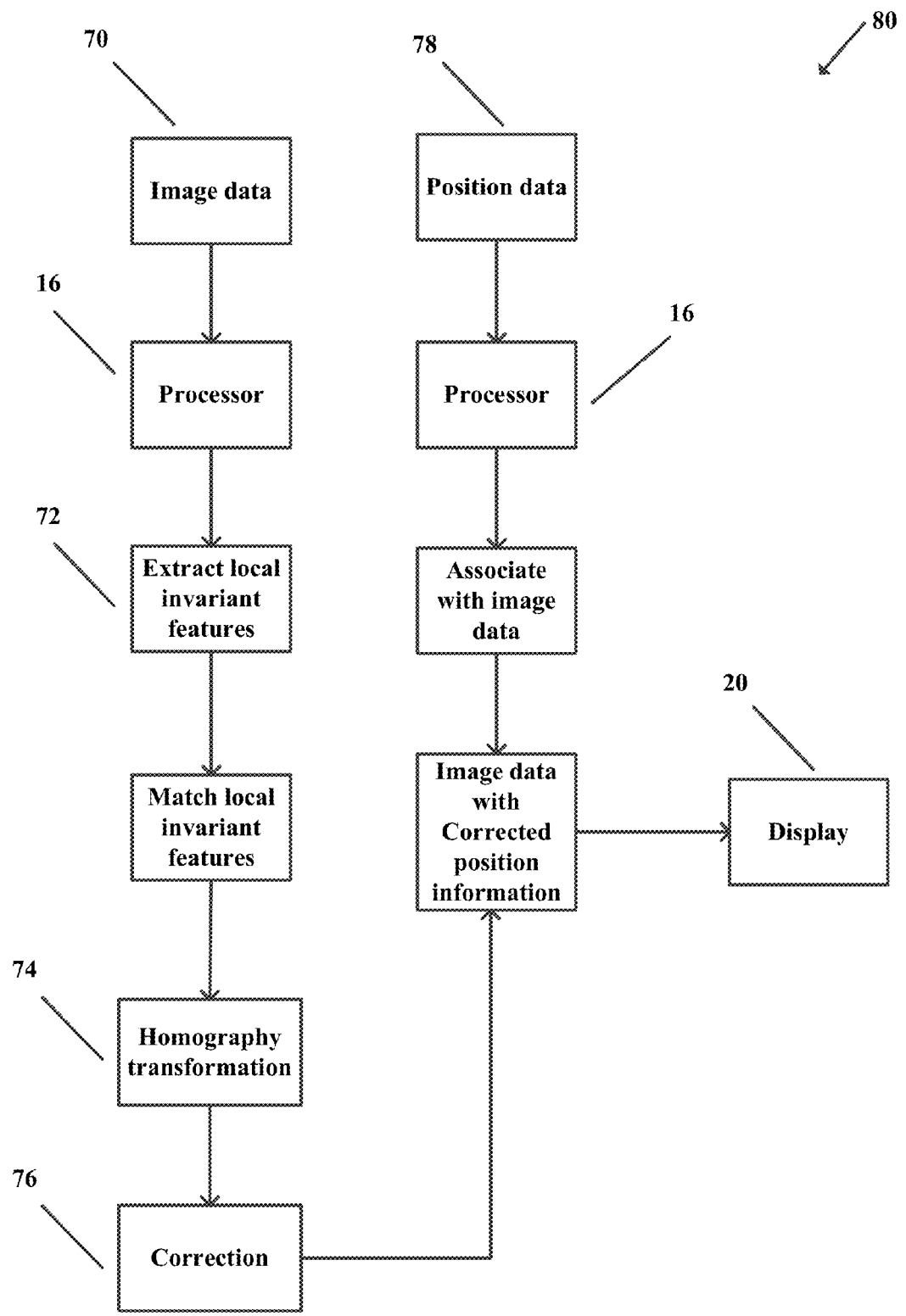
FIG. 7 is a flow chart which illustrates an example method for correcting position information of an image used for generating a composite image according to one example embodiment of the invention.

FIG. 7 illustrates a method 80 for correcting position information of an image used for generating a composite image according to one example embodiment. Image data 70 of captured images is provided to processor 16. Processor 16 then extracts local invariant features 72 from image data 70 based on methods known to a person skilled in the art in light of the present disclosure. In one embodiment, SIFT is used for extracting the local invariant features between images from image data 70. Processor 16 then matches local invariant features 72 between image data 70 of different images to create corresponding homography transformations 74. Processor 16 then uses homography transformations 74 to generate corrections 76. Position information 78 is provided to processor 16 by position sensor 14 and associated with image data 70. Processor 16 then applies correction 76 to position information 78 to correct positional information for the captured images for errors caused, for example, by drift of position sensor 14. Image data 70 with corrected position information is then displayed as representations on display 20. The method for correcting position information may further comprise making a bundle adjustment each time a new image is added to the set of captured images. The bundle adjustment uses the matched features of all stored images to refine and optimize corrections 76.

In one embodiment, position information 78 is generated by a gyroscope. Position information may be an attitude of imaging apparatus 10 when an image is captured. The attitude may be represented by a 3-D rotation matrix that provides information on roll, pitch, and yaw of imaging apparatus 10. In other embodiments, correction 76 is applied to position information 78 before association with image data 70. In yet other embodiments, position information 78 is corrected near real-time by correction 76. In further embodiments, correction 76 is updated continuously based on new image data 70. In other embodiments, correction 76 is updated periodically by processor 16 based on position information from position sensor 14. In yet other embodiments, correction 76 is undertaken iteratively as new images are captured.

Figure 8:
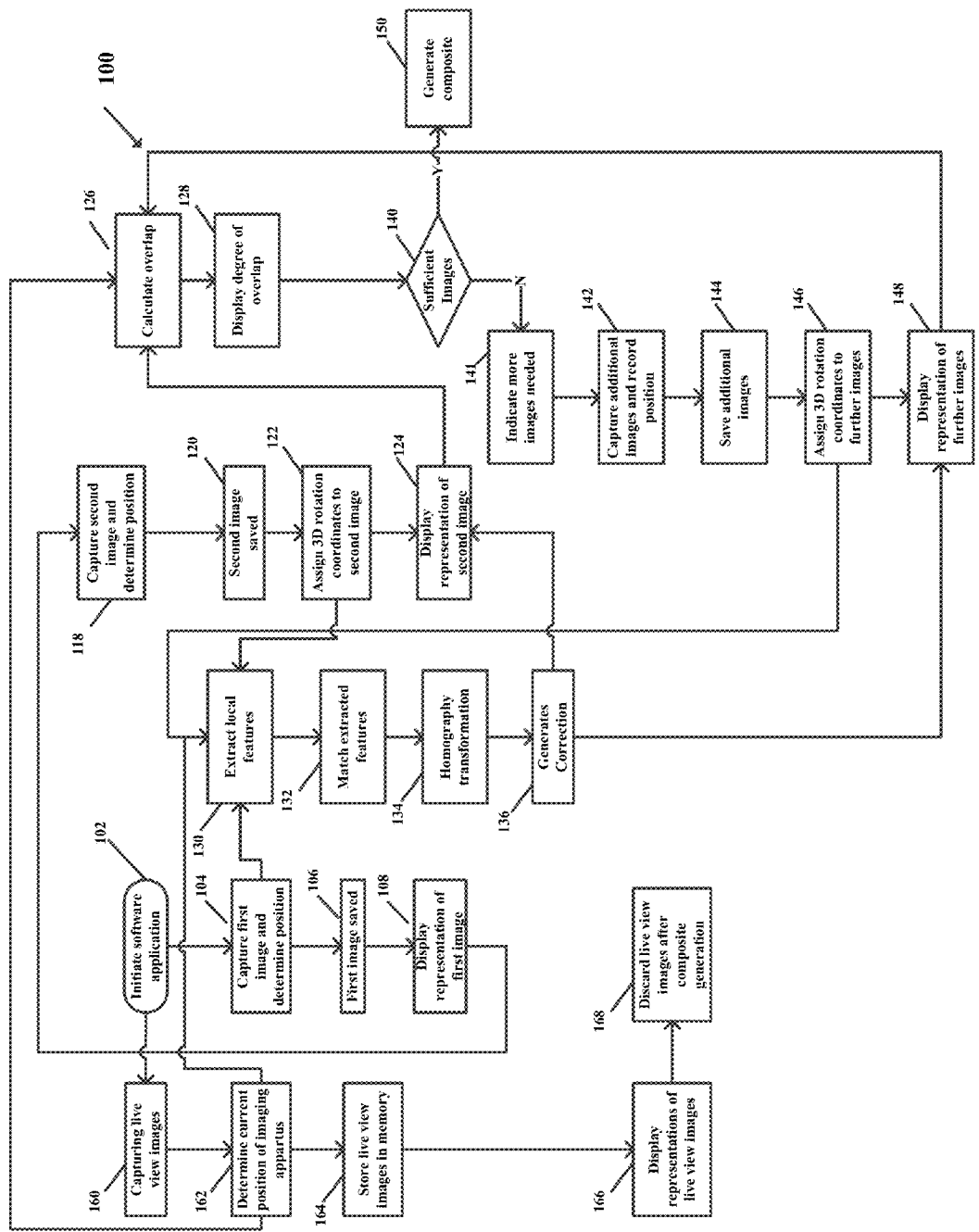
FIG. 8 illustrates an example method for acquiring images for generating a composite image of scene 1 according to one example embodiment of the invention.

FIG. 8 illustrates a method 100 for acquiring images for generating a composite image of scene 1 according to one example embodiment. Software application for acquiring images, as executed by processor 16 of imaging apparatus 10, is initiated at 102. A first image of scene 1 is captured at 104 and image data is received by image sensor 12 and saved to memory of imaging apparatus 10 at 106. Position of imaging apparatus 10 is determined by gyroscope 51 and saved to memory of imaging apparatus 10 as a 3×3 rotation matrix representing full roll, pitch, and yaw of imaging apparatus 10. First image of scene 1 is assigned a matrix of zero rotation and a representation of the first image is displayed on display 20 at 108. A second image of scene 1 is then captured and gyroscope 51 captures gyroscopic data 53 at 118. Image data of second image is received by image sensor 12 and saved to memory of imaging apparatus 10 at 120. Gyroscopic data 53 for the second image is compared to the position of imaging apparatus 10 when the first image is taken, and a 3D rotation coordinate relative to the position information of the first image is assigned by processor 16 to second image at 122. A representation of second image is then displayed on display 20 at 124. Software application, as executed by processor 16, extracts local invariant features from image data for the first and second image of scene 1 using nearest-neighbour matching at 132. In one embodiment, software application utilizes SIFT for invariant feature matching. The feature matches are then used by processor 16 to generate a homography transformation between locations of the first image and the second image at 134. The homography transformation is then used by processor 16 to generate a correction factor at 136. Correction factor is then used by processor 16 to correct position of the representation of the second image as shown on display 20.

Processor 16 also calculates overlap between first image and second image at 126. As discussed previously herein, overlap may be calculated by finding the closest captured image to the live view image based on the angular differences of the center of the viewports of the captured images. The closest captured image is then projected as a rectangle (as a representation of the field of view) into the plane of the live view image. Processor 16 then computes the union of the areas of the live view image and the projected captured image. In this embodiment, overlap is the percentage of the area of the live view image rectangle covered by the projected captured image. The overlap percentage is then displayed on display 20 in association with representations of captured images.

Where a sufficient number of overlapping images of scene 1 have been captured for generating composite image, processor 16 may instruct display 20 to indicate a composite image of scene 1 may be generated at 140. Where further images of scene 1 are required, processor 16 instructs display 20 to show that more images are needed at 141. Further images of scene 1 are captured at 142 with gyroscopic information of imaging apparatus 10 collected. Image data of such further images are saved into memory of imaging apparatus 10 at 144. 3D rotation matrix for each further image is assigned based on gyroscope information 53 provided by gyroscope 51 at 146. Processor 16 extracts local invariant features from each additional image at 130 and features are extracted and matched at 132. Homography transformation is generated based on feature matches of all captured images at 134 and new correction factor is generated at 136. The correction factor is then applied by processor 16 to correct position of each additional image at 148. As each additional image is captured, overlap quality is calculated at 126 and degree of overlap displayed at 128. The process continues until there are sufficient overlapping images of scene 1 so that composite image of scene 1 can be generated at 150.

In this embodiment, live view images are captured at 160 by imaging apparatus 10. Current position of imaging apparatus 10 is provided at 162 and associated with the live view image. Live view image is stored temporarily in memory at 164. Processor 16 instructs display 20 to show a representation of the live view image at 166. Live view image may also be used by processor 16 for calculating overlap at 126. Processor 16 may also use live view images to generate correction 136 by extracting local features from live view images at 130, matching extracted features at 132, and generating homography transformation at 134. When user decides to generate a composite or decides not to generate the composite, information about live view image may be deleted from imaging apparatus 10 at 168.

In some embodiments, methods as described herein may be carried out by a software application installed on imaging apparatus 10. In other embodiments, the software application is preloaded on imaging apparatus 10.

Figure 9:
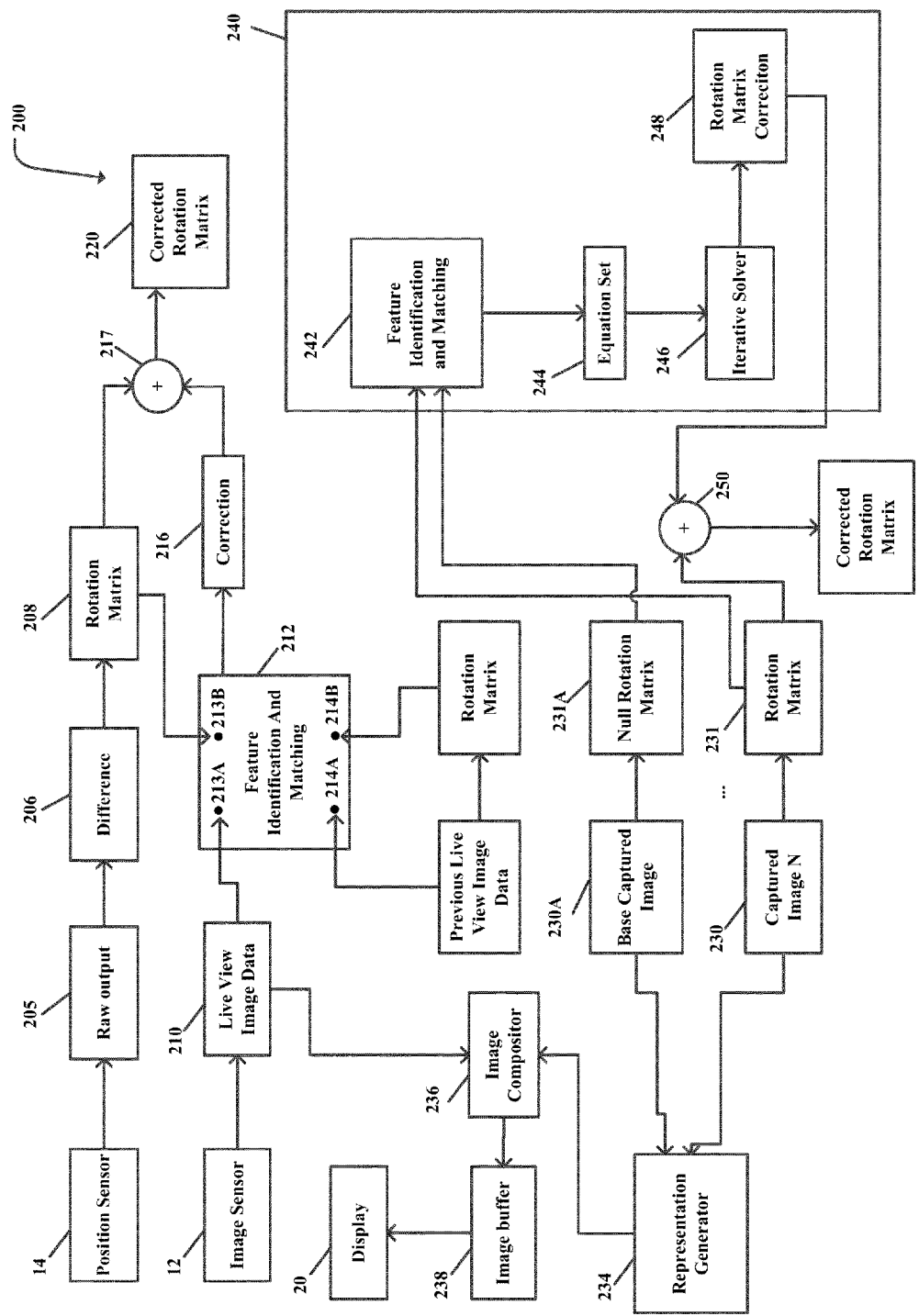
FIG. 9 illustrates an apparatus according to another example embodiment.

FIG. 9 shows apparatus 200 according to another non-limiting example embodiment. Apparatus 200 comprises position sensor 14, image sensor 12, and display 20. Raw output 205 of position sensor 14 is compared to prior raw output by difference calculator 206 to yield a rotation matrix 208. Live view image data 210 captured by image sensor 12 and rotation matrix 208 are supplied to first inputs 213A and 213B of feature identification and matching system 212. Second inputs 214A and 214B of feature identification and matching system 212, respectively, receive image data and a rotation matrix from a previously acquired image (which may be stored previous live view image data or a previously captured image that overlaps with the current live view image). Feature identification and matching system 212 outputs a correction 216 that is combined with uncorrected rotation matrix 208 at 217 to yield a corrected rotation matrix 220 corresponding to the current live view image. If a new image is captured then corrected rotation matrix 220 may be used as the rotation matrix for the new image. A base captured image 230A is associated with a null rotation matrix 231A. Any reasonable number of captured images 230 each associated with a rotation matrix 231 may be stored in apparatus 200. A representation generator 234 generates representations of captured images 230, 230A. An image compositor 236 superposes the representations on live view image data 210 and stores the result in an image buffer 238 for real-time display on display 20. A bundle adjustment system 240 includes feature identification and matching system 242 which generates an equation set 244 based on relationships of features identified in pairs of captured images 230, 230A. Equation set 244 is solved by iterative solver 246 to yield a set 248 of corrections to rotation matrices 231. These corrections are applied at 250. Not shown in apparatus 200 is a system for generating user controls and supplying graphic representations for those user controls to image compositor 236 for display on display 20 and a user interface configured to receive user commands to capture images, manipulate the images displayed on display 20, delete previously-captured images etc.

As will be apparent to those skilled in the art in the light of the foregoing disclosure, many alterations and modifications are possible in the practice of this invention without departing from the spirit or scope thereof. For example:

- In the example methods above, information from a barometer, which measurers atmospheric pressure and can provide altitude information, may be used to further correct position information of captured images. Many mobile phones and smart phones have barometers already built in.
- In some applications, it is practical to provide users with an option to adjust alignment and matching sensitivities used by processor 16 when multiple captured images are combined into a composite image.
- Imaging apparatus 10 may also include the ability to share, upload, or otherwise distribute the generated composite image through the Internet.

INTERPRETATION OF TERMS

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Embodiments may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices, wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, imaging sensor, position sensor, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

Accordingly, the scope of the invention is to be construed in accordance with the substance defined by the following claims.

What is claimed is:

1. An apparatus for capturing images used for generating a composite image of a scene, the apparatus comprising:
   an image sensor for capturing images;
   a position sensor for determining the apparatus's position when the images are captured;
   one or more processors configured to:
      associate the apparatus' position when each of the images is captured with such image;
      generate a composite image including a live image received from the image sensor and representations of the captured images superimposed onto the live image using the associated positions, wherein each representation of a captured image includes a frame defining an area of the captured image relative to a position on the live image, the representations indicating areas of a scene being depicted in the live image that have already been acquired as captured images;
      provide the composite image to the display;
   a display for displaying the composite image, the display having controls for manipulating the representations of the composite image.

2. An apparatus according to claim 1 wherein the position sensor comprises a gyroscope.

3. An apparatus according to claim 1 wherein the apparatus is a mobile computing device.

4. An apparatus according to claim 1 wherein the representations are displayed by the display with perspective distortion based on positioning of the apparatus.

5. An apparatus according to claim 1 wherein the one or more processors are further configured to align the captured images using SIFT.

6. An apparatus according to claim 5 wherein the one or more processors are configured to use the alignment information to correct the associated positions.

7. An apparatus according to claim 1 wherein the controls comprise interfaces for replacing or deleting one or all of the representations.

8. An apparatus according to claim 1 wherein the representations include image data of the captured images and the controls comprise opacity modifiers for adjusting opacity of the representations relative to the live image.

9. An apparatus according to claim 1 wherein the controls are superimposed on top of the composite image.

10. An apparatus according to claim 1 wherein the composite image is a panoramic image of the scene.

11. An apparatus according to claim 1 wherein the representations further comprise one or more markers indicating position of the captured image.

12. The apparatus of claim 1, wherein the representations are overlaid with a predetermined image treatment that makes the areas corresponding to the captured images visually distinctive from the live image.

13. A method for correcting position information of images captured with an imaging apparatus and displaying representations of the captured images, the method comprising:
   matching, by one or more processors, features on the captured images having overlapping segments;
   creating, by the one or more processors, a correction factor based on the matched features;
   correcting, by the one or more processors, position information associated with each captured image based on the correction factor;
   generating, by the one or more processors, a composite image including a live image received from an image sensor and representations of the captured images superimposed onto the live image using the corrected position information, wherein each representation of a captured image includes a frame defining an area of the captured image relative to a position on the live image, the representations indicating areas of a scene being depicted in the live image that have already been acquired as captured images;
   providing, by the one or more processors, the composite image for display.

14. A method according to claim 13 wherein the position information comprises a 3-D rotation matrix that provides information about the roll, pitch, and yaw of the imaging apparatus when the image is captured.

15. A method according to claim 13 further comprising the steps of generating a bundle adjustment from a plurality of captured images and correcting the position information is further based on the bundle adjustment.

16. A method according to claim 13 further comprising the step of displaying the composite image on a display of the imaging apparatus with controls for manipulating the captured images.

17. A method according to claim 13 wherein SIFT is used for matching features in the captured images.

18. A method according to claim 13 wherein the correction factor is created by homography transformation.

19. A method according to claim 13 wherein the correction of position information occurs continuously as images are captured.

20. A method according to claim 13 wherein the correction of position information occurs iteratively.

21. A method according to claim 13 wherein the correction factor is a 3-D rotation matrix.

22. A method for capturing images using an imaging apparatus having a display for displaying a composite image of a scene, the method performed comprising:
   associating, by one or more processors, position information of the imaging apparatus when at least two of the images are captured with the applicable image;
   correcting, by one or more processors, position information of the at least two images based on overlap between the captured images;
   using the position information to generate a representation for each of the at least two images, wherein each representation includes a frame defining an area one of the at least two images;
   generating a composite image including a live image received from an image sensor and the representations of the at least two images superimposed onto the live image such that the representations indicate areas of a scene being depicted in the live image that have already been acquired and the live image also indicates areas of the scene that have not already been acquired;

providing, by one or more processors, the display with the composite image.

23. A method according to claim 22 wherein the position information comprises a 3-D rotation matrix that provides information about the roll, pitch, and yaw of the imaging apparatus.

24. A method according to claim 22 further comprising the step of providing a guide on the display to indicate whether sufficient images have been captured for generating the composite image.

25. A method according to claim 22 further comprising the step of providing touch controls to manipulate the representations.

26. A method according to claim 25 wherein the touch controls comprise interfaces for replacing or deleting one or all of the representations.

27. A method according to claim 25 wherein the touch controls act by raytracing from the 2-D location of a touch to a 3-D line representation in the space shown on the display.

28. A method according to claim 22 wherein SIFT is used to determine the overlap between the captured images.

29. A method according to claim 28 wherein the correction of position information is based on a correction factor generated by homography transformation of SIFT results.

30. A method according to claim 22 wherein the composite image is a panoramic image of the scene.

\* \* \* \* \*